United States Patent
Lee et al.

(10) Patent No.: US 9,008,006 B2
(45) Date of Patent: Apr. 14, 2015

(54) RANDOM ACCESS METHOD FOR MULTIMEDIA BROADCAST MULTICAST SERVICE(MBMS)

(75) Inventors: Young Dae Lee, Anyang-si (KR); Sung Duck Chun, Anyang-si (KR); Seung Jun Yi, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 733 days.

(21) Appl. No.: 12/452,905

(22) PCT Filed: Aug. 11, 2008

(86) PCT No.: PCT/KR2008/004665
§ 371 (c)(1),
(2), (4) Date: Jan. 28, 2010

(87) PCT Pub. No.: WO2009/022836
PCT Pub. Date: Feb. 19, 2009

(65) Prior Publication Data
US 2010/0128648 A1    May 27, 2010

Related U.S. Application Data

(60) Provisional application No. 60/955,040, filed on Aug. 10, 2007, provisional application No. 60/955,651, filed on Aug. 14, 2007.

(30) Foreign Application Priority Data

Aug. 11, 2008   (KR) .................. 10-2008-0078477

(51) Int. Cl.
*H04W 4/00* (2009.01)
*H04B 7/216* (2006.01)
(Continued)

(52) U.S. Cl.
CPC ........ *H04W 74/002* (2013.01); *H04W 74/0833* (2013.01); *H04W 74/0866* (2013.01)

(58) Field of Classification Search
USPC ........... 370/312, 329, 335; 455/406, 450, 466
See application file for complete search history.

(56) References Cited

U.S. PATENT DOCUMENTS 5,878,041 A   3/1999  Yamanaka et al.
6,445,917 B1  9/2002  Bark et al.
(Continued)

FOREIGN PATENT DOCUMENTS

CN   1349360   5/2002
CN   1613210   5/2005
(Continued)

OTHER PUBLICATIONS

"Redundant Retransmission Restraint in RLC-AM" 3GPP TSG-RAN WG2 Meeting #53; May 8-12, 2006; Shanghai, China.
(Continued)

*Primary Examiner* — Brandon Renner
(74) *Attorney, Agent, or Firm* — McKenna Long & Aldridge LLP

(57) ABSTRACT

A method of performing random access procedure in a wireless communication system is disclosed. The present invention includes the steps of receiving a first message transmitted to count the number of user equipments attempting to receive the broadcast/multicast service from a network, transmitting a preamble for a random access to the network, receiving a second message including a user equipment identifier for identifying the user equipment and uplink (UL) radio resource allocation information in response to the preamble from the network, transmitting a third message to the network using the uplink radio resource allocation information, and stopping the random access in case of receiving a contention resolution message from the network.

10 Claims, 5 Drawing Sheets

(51) Int. Cl.
*H04M 11/00* (2006.01)
*H04W 72/00* (2009.01)
*H04W 74/00* (2009.01)
*H04W 74/08* (2009.01)

(56) References Cited

U.S. PATENT DOCUMENTS

| | | |
|---|---|---|
| 6,594,240 B1 | 7/2003 | Chuah et al. |
| 6,594,244 B1 | 7/2003 | Chang et al. |
| 6,628,946 B1 | 9/2003 | Wiberg et al. |
| 6,728,918 B1 | 4/2004 | Ikeda et al. |
| 6,738,624 B1 | 5/2004 | Aksentijevic et al. |
| 6,874,113 B2 | 3/2005 | Chao et al. |
| 6,967,936 B1 | 11/2005 | Laroia et al. |
| 6,987,985 B2 | 1/2006 | Purkayastha et al. |
| 7,009,940 B2 | 3/2006 | Vialen et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,710,930 B2 | 5/2010 | Kwak |
| 7,796,505 B2 | 9/2010 | Olsson et al. |
| 7,817,595 B2 | 10/2010 | Wu |
| 7,876,771 B2 | 1/2011 | Bergström et al. |
| 7,978,616 B2 | 7/2011 | Chun et al. |
| 8,027,321 B2 | 9/2011 | Zheng |
| 8,027,363 B2 | 9/2011 | Chun et al. |
| 8,059,597 B2 | 11/2011 | Park et al. |
| 8,081,662 B2 | 12/2011 | Chun et al. |
| 8,130,687 B2 | 3/2012 | Cai et al. |
| 8,270,361 B2 | 9/2012 | Yi et al. |
| 8,335,189 B2 | 12/2012 | Wang et al. |
| 8,712,055 B2 | 4/2014 | Yi |
| 2002/0001314 A1 | 1/2002 | Yi et al. |
| 2002/0009999 A1 | 1/2002 | Lee et al. |
| 2002/0122411 A1 | 9/2002 | Zimmerman et al. |
| 2003/0007490 A1 | 1/2003 | Yi et al. |
| 2003/0194992 A1 | 10/2003 | Kim et al. |
| 2004/0008659 A1 | 1/2004 | Kim |
| 2004/0022213 A1 | 2/2004 | Choi et al. |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1* | 7/2004 | Kim et al. .................. 370/329 |
| 2004/0147236 A1 | 7/2004 | Parkvall et al. |
| 2004/0156330 A1 | 8/2004 | Yi et al. |
| 2004/0184438 A1 | 9/2004 | Terry |
| 2004/0229626 A1 | 11/2004 | Yi et al. |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen |
| 2005/0094596 A1 | 5/2005 | Pietraski et al. |
| 2005/0096017 A1 | 5/2005 | Kim |
| 2005/0105499 A1 | 5/2005 | Shinozaki et al. |
| 2005/0118992 A1 | 6/2005 | Jeong et al. |
| 2005/0164683 A1 | 7/2005 | Roberts et al. |
| 2005/0192021 A1 | 9/2005 | Lee et al. |
| 2005/0195852 A1 | 9/2005 | Vayanos et al. |
| 2005/0201354 A1 | 9/2005 | Hosaka et al. |
| 2005/0237932 A1 | 10/2005 | Liu |
| 2005/0237972 A1 | 10/2005 | Van Dervelde et al. |
| 2005/0249141 A1 | 11/2005 | Lee et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0030342 A1* | 2/2006 | Hwang et al. .................. 455/466 |
| 2006/0056441 A1 | 3/2006 | Jiang |
| 2006/0067238 A1 | 3/2006 | Olsson et al. |
| 2006/0067289 A1 | 3/2006 | Lee et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0280145 A1 | 12/2006 | Revel et al. |
| 2006/0281456 A1 | 12/2006 | Roberts et al. |
| 2007/0047493 A1 | 3/2007 | Park et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 | 4/2007 | Torsner |
| 2007/0091810 A1 | 4/2007 | Kim et al. |
| 2007/0133456 A1 | 6/2007 | Ding |
| 2007/0178878 A1* | 8/2007 | Ding .................. 455/403 |
| 2007/0183358 A1 | 8/2007 | Cai |
| 2007/0189205 A1 | 8/2007 | Terry et al. |
| 2007/0201397 A1 | 8/2007 | Zhang |
| 2007/0206530 A1* | 9/2007 | Lee et al. .................. 370/329 |
| 2007/0268861 A1 | 11/2007 | Diachina et al. |
| 2007/0274278 A1 | 11/2007 | Choi et al. |
| 2007/0287440 A1 | 12/2007 | Benkert et al. |
| 2007/0297367 A1 | 12/2007 | Wang et al. |
| 2008/0002688 A1 | 1/2008 | Kim et al. |
| 2008/0043658 A1* | 2/2008 | Worrall .................. 370/312 |
| 2008/0045224 A1 | 2/2008 | Lu et al. |
| 2008/0045272 A1 | 2/2008 | Wang et al. |
| 2008/0049682 A1* | 2/2008 | Ding et al. .................. 370/335 |
| 2008/0051098 A1 | 2/2008 | Rao |
| 2008/0059859 A1 | 3/2008 | Marinier et al. |
| 2008/0081598 A1 | 4/2008 | Chandra et al. |
| 2008/0165717 A1 | 7/2008 | Chen et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0232396 A1 | 9/2008 | Buckley et al. |
| 2008/0233941 A1 | 9/2008 | Jen |
| 2008/0261581 A1* | 10/2008 | Cai .................. 455/422.1 |
| 2008/0268878 A1 | 10/2008 | Wang et al. |
| 2008/0273482 A1 | 11/2008 | Lee et al. |
| 2008/0273610 A1 | 11/2008 | Malladi et al. |
| 2008/0310395 A1 | 12/2008 | Kashima |
| 2008/0318578 A1 | 12/2008 | Worrall |
| 2009/0016301 A1 | 1/2009 | Sammour et al. |
| 2009/0104890 A1 | 4/2009 | Wang et al. |
| 2009/0175163 A1 | 7/2009 | Sammour et al. |
| 2009/0175253 A1 | 7/2009 | Wu et al. |
| 2009/0305712 A1* | 12/2009 | Franceschini et al. ........ 455/450 |
| 2009/0323574 A1 | 12/2009 | Koskinen |
| 2010/0128648 A1 | 5/2010 | Lee et al. |
| 2010/0232335 A1 | 9/2010 | Lee et al. |
| 2011/0019604 A1 | 1/2011 | Chun et al. |

FOREIGN PATENT DOCUMENTS

| | | |
|---|---|---|
| CN | 1761356 A | 4/2006 |
| EP | 1 035 745 A1 | 9/2000 |
| EP | 1 343 267 | 9/2003 |
| EP | 1 508 992 | 2/2005 |
| EP | 1557967 A | 7/2005 |
| EP | 1578111 A1 | 9/2005 |
| EP | 1655879 A1 | 5/2006 |
| EP | 1 689 130 | 8/2006 |
| EP | 1 746 855 | 1/2007 |

(56) References Cited

FOREIGN PATENT DOCUMENTS

| | | |
|---|---|---|
| EP | 1 768 297 | 3/2007 |
| EP | 1 796 405 | 6/2007 |
| JP | 07-162948 | 6/1995 |
| JP | 2001-197021 | 7/2001 |
| JP | 2003-018050 A | 1/2003 |
| JP | 2003-115796 A | 4/2003 |
| JP | 2003-283592 A | 10/2003 |
| JP | 2006-054718 A | 2/2006 |
| JP | 2006-514466 A | 4/2006 |
| JP | 2007-116639 | 5/2007 |
| KR | 10-2001-0045783 | 6/2001 |
| KR | 10-2001-0062306 | 7/2001 |
| KR | 10-2002-0004645 | 1/2002 |
| KR | 10-2002-0097304 | 12/2002 |
| KR | 10-2003-0012048 | 2/2003 |
| KR | 10-2003-0060055 | 7/2003 |
| KR | 10-2003-0068743 | 8/2003 |
| KR | 10-2003-0087914 A | 11/2003 |
| KR | 10-2004-0016334 A | 2/2004 |
| KR | 1020040016065 A | 2/2004 |
| KR | 10-2004-0034398 | 4/2004 |
| KR | 10-2004-0039944 | 5/2004 |
| KR | 10-2004-0072961 | 8/2004 |
| KR | 10-2005-0022988 | 3/2005 |
| KR | 10-2005-0029395 A | 3/2005 |
| KR | 10-2005-0062359 | 6/2005 |
| KR | 10-2005-0081836 | 8/2005 |
| KR | 10-2005-0092874 | 9/2005 |
| KR | 10-2005-0099472 | 10/2005 |
| KR | 10-2005-0100882 | 10/2005 |
| KR | 10-2005-0103127 A | 10/2005 |
| KR | 10-2006-0004935 | 1/2006 |
| KR | 10-2006-0014910 | 2/2006 |
| KR | 1020060029452 | 4/2006 |
| KR | 10-2006-0042858 | 5/2006 |
| KR | 10-2006-0069378 | 6/2006 |
| KR | 10-2006-0079784 | 7/2006 |
| KR | 10-2006-0090191 | 8/2006 |
| KR | 10-2006-0134058 | 12/2006 |
| KR | 1020060131671 A | 12/2006 |
| KR | 10-2007-0048552 | 5/2007 |
| KR | 1020070076374 | 7/2007 |
| KR | 1020080085694 A | 9/2008 |
| RU | 2304348 | 8/2007 |
| WO | WO 03/045103 | 5/2003 |
| WO | WO 2004/042963 | 5/2004 |
| WO | WO 2005/039108 | 4/2005 |
| WO | WO 2005/079105 | 8/2005 |
| WO | WO 2005/125226 | 12/2005 |
| WO | WO 2006/016785 | 2/2006 |
| WO | WO 2006/033521 | 3/2006 |
| WO | WO 2006/046894 | 5/2006 |
| WO | WO 2006/052086 | 5/2006 |
| WO | WO 2006/083149 | 8/2006 |
| WO | WO 2006/104335 | 10/2006 |
| WO | WO 2006/104342 | 10/2006 |
| WO | WO 2006/116620 A2 | 11/2006 |
| WO | WO 2006/118418 | 11/2006 |
| WO | WO 2007/024065 | 3/2007 |
| WO | WO 2007/039023 | 4/2007 |
| WO | WO 2007/052900 | 5/2007 |
| WO | WO 2007/066900 | 6/2007 |
| WO | WO 2007/078142 | 7/2007 |
| WO | WO 2007/078155 A2 | 7/2007 |
| WO | WO 2007/078164 | 7/2007 |
| WO | WO 2007/078173 | 7/2007 |
| WO | WO 2007/078174 | 7/2007 |
| WO | WO 2007/089797 | 8/2007 |
| WO | WO 2007/126793 | 11/2007 |
| WO | WO 2007-078174 A1 | 12/2007 |
| WO | WO 2007/147431 | 12/2007 |
| WO | 2008/060097 A1 | 5/2008 |

OTHER PUBLICATIONS

Digital Cellular Telecommunications System (Phase 2+); Functional Stage 2 Description of Location Services (LCS) in Geran (3GPP TS 43.059 Version 7.3.0 Release 7); ETSI TS 143 059 V7.3.0 (May 2007).
Ghosh, A. et al.; "Random Access Design for UMTS Air-Interface Evolution"; Vehicular Technology Conference, 2007. VTC2007—Spring IEEE 65th; Apr. 22-25, 2007; pp. 1041-1045.
Sadayuki Abeta et al., "Super 3G Technology Trends. Part 2: Research on Super 3G Technology", NTT DoCoMo Technical Journal, vol. 8, No. 3, pp. 55-62, Dec. 2006, See Section 3; Figure 5.
Nokia, "System Information Distribution", 3GPP TSG-RAN WG2 Ad Hoc Meeting on LTE, R2-061487, Cannes, France, pp. 1-3, Jun. 27-30, 2006, See Section 2.
LG Electronics, "Delivery of LTE System Information", 3GPP TSG-RAN WG2 Ad Hoc on LTE, R2-061959, Cannes, France, pp. 1-4, Jun. 27-30, 2006, See Section 3.
NEC: "Optimised buffer status reporting" 3GPP TSG-RAN WG2#58BIS Meeting, Orlando USA, Jun. 25-29, 2007; 20070625, vol. R2-072515 (Jun. 20, 2007), pp. 1-6, XP002503220.
Catt, Ritt: "Consideration on UL buffer reporting" 3GPP TSG-RAN WG2 #55, R2-062934 (Oct. 9, 2006), pp. 1-3, XP002513924 ISSN: 9 URL:http://www.3gpp.org/ftp/tsg_ran/WG2_RL2/TSGR2_55/Documents/.
LG Electronics Inc: "UE State Transition in LTE_ACTIVE", 3 GPP TSG-RAN WG2 #52; Athens, Greece; Mar. 2006.
Texas Instruments: "UL Synchronization Management and Maintenance in E-UTRA"; Kobe, Japan; May 2007.
Texas Instruments: "UL Synchronization Management in LTE_ACTIVE"; St. Julians, Malta; Mar. 2007.
Motorola: "Contention-Free Intra-LTE Handover"; St. Louis, USA; Feb. 2007.
Ericsson: "Scheduling Request in E-UTRAN"; Sorrento, Italy; Jan. 2007.
ASUSTek, "Summary of HFN de-synchronization problem off-line email discussion", 3GPP TSG RAN WG2 #46 Tdoc R2-050318, Feb. 2005.
ASUSTek, "On-line recovery of HFN synchronization due to RLC UM SN problem", 3GPP TSG-RAN WG2 Meeting #44 R2-041940, Oct. 2004.
Wang et al., U.S. Appl. No. 60/976,139.
Sammour et al., U.S. Appl. No. 61/019,058.
Reuven Cohen: "An Improved SSCOP-like Scheme for Avoiding Unnecessary Retransmissions and Achieving Ideal Throughput", Conference on Computer Communications, Fifteenth Annual Joint conference of the IEEE computer and communications societies, Mar. 24-28, 1996, vol. 2, pp. 855-862, XP010158150.
Nokia: "Buffer reporting for E-UTRAN", vol. R2-060829, pp. 1-5, XP002503218, 3GPP TSG-RAN WG2 Meeting #62, Athens, Greece. Mar. 27-31, 2006.
Nokia: "Uplink Scheduling for VoIP", No. R2-070476, Feb. 12-16, 2007, pp. 1-15, XP008125208, 3GPP TSG-RAN WG2 Meeting #57, St. Louis, Missouri.
LG Electronics Inc., "Discussion on BCCH update", 3GPP TSG-RAN WG2 #58bis, Jun. 25-29, 2007, Orlando, FL, R2-072736.
Catt, "Notification scheme for system information change", 3GPP TSG-RAN WG2 #58, May 7-11, 2007, Kobe, Japan, R2-071870.
NTT DOCOMO: "Uplink synchronization", 3GPP TSG RAN WG2 #57, Feb. 12-16, 2007; XP002713200, R2-070781, Feb. 12, 2007, pp. 1-3.
Samsung: "MAC functions: ARQ", 3GPP TSG-RAN2 Meeting #51, XP002488423, R2-060374, Feb. 13, 2006, pp. 1-5.
"Handling of HFN de-synchronization", 3GPP Draft; R2-074746 Handling of HFN Desynchronization, 3rd Generation Partnership Project(3GPP), XP050137261, Nov. 12, 2007.
LG Electronics: "Overall control signaling structure for generic Lte TDD." 3GPP Draft:—TDD Control Signaling, 3rd Generation Partnership Project (3GPP), Mobile Competence Centre; 650, Route Des

(56) References Cited

OTHER PUBLICATIONS

Lucioles ; F-06921 Sophia-Antipolis Cedex ; France, vol. RAN WG1, No. Beijing, China; Apr. 17, 2007, XP050111754, R1-071848.
Siemens: "Signaling in DL for uplink resource allocation", 3GPP Draft; 3rd Generation Partnership Project (3GPP), Mobile Competence Centre ; 650, Route Des Lucioles ; F-06921 Sophia-Antipolis Cedex ; France, vol. RAN WG1, No. Shanghai, China; May 2, 2006, XP050102168; R1-061290.

* cited by examiner

RANDOM ACCESS METHOD FOR MULTIMEDIA BROADCAST MULTICAST SERVICE(MBMS)

This application is a national phase application based on International Application No. PCT/KR2008/004665 filed on Aug. 11, 2008, which claims priority to Korean Patent Application No. 10-2008-0078477 filed on Aug. 11, 2008, U.S. Provisional Application Application No. 60/955,040, filed on Aug. 10, 2007, and U.S. Provisional Application No. 60/955,651, filed Aug. 14, 2007, all of which are incorporated by reference for all purposes as if fully set forth herein.

TECHNICAL FIELD

The present invention relates to a wireless mobile communication system, and more particularly, to a random access method for a multimedia broadcast multicast service in a wireless mobile communication system.

BACKGROUND ART

Various data/services are transmitted and provided in a network (E-UTRAN: evolved universal terrestrial radio access network) according to the asynchronous mobile communication system standard (3GPP). For instance, there are system information via BCH (broadcast channel), control message via PDCCH (physical downlink control channel), user traffic or control message via downlink/uplink SCH (shared channel), traffic or control message of broadcast/multicast service (MBMS) via downlink SCH or downlink MCH (multicast channel), initial uplink control message via RACH (random access channel) and the like.

The MBMS (multimedia broadcast multicast service) is a sort of a broadcast/multicast service and is the service that simultaneously transmits data packets to a plurality of user equipments. In this disclosure, 'broadcast/multicast service' can be replaced by one of different terminologies including 'MBMS', 'point-to-multipoint service', 'MBS (multicast and broadcast service' and the like. In the MBMS based on IP multicast, user equipments share resources required for data packet transmission and receive the same multimedia data. Hence, in case that a user equipment at a predetermined level, which uses MBMS, exists in the same cell, it is able to raise resource efficiency. As the MBMS has nothing to do with an RRC connection, a user equipment in an idle mode can be provided with the service.

Operational schemes of the MBMS can be categorized into two modes including a broadcast mode and a multicast mode. The broadcast mode is the mode that a single transmitter transmits data to all receivers on a sub-network. And, the multicast mode is the mode that at least one or more transmitters transmit data to at least one or more specific receivers. In the multicast mode, an intention to receive data needs to be delivered to a network and subscription and leaving is available.

In order to effectively operate the broadcast/multicast service, it is necessary to check the number of user equipments that attempt to receive a specific service. This kind of information is usable in determining an optimal scheme for providing the broadcast/multicast service. For instance, if the small number of user equipments are interested in the corresponding service, it may be more efficient to use a separate dedicated channel to provide the service to each of the user equipments. On the contrary, if a plurality of user equipments are interested in the corresponding service, it may be more efficient to use a common channel.

A method of counting user equipments attempting to receive a specific broadcast/multicast service (hereinafter named 'MBMS counting') is initiated in a manner that a network transmits an access information message to a user equipment via MCCH. If the user equipment attempting to receive the service is in an RRC connected state, counting can proceed using a dedicated channel or a RACH. On the other hand, if a user equipment is in an idle mode, an RRC connection request message is transmitted in accordance with a random access procedure using a RACH.

In the following description, the RACH and a random access procedure in WCDMA system are explained. First of all, a RACH is used to transmit data of a short length in uplink. And, such an RRC message as an RRC connection request message, a cell update message, a URA update message and the like is transmitted via the RACH. A logical channel such as CCCH (common control channel), DCCH (dedicated control channel) and DTCH (dedicated traffic channel) can be mapped to the RACH which is a transport channel. And, the RACH is mapped to a physical channel PRACH (physical random access channel).

Once a MAC (medium access control) layer of a user equipment indicates a PRACH transmission to a physical layer of the UE, the physical layer of the UE selects a single access slot and a single signature and then transmits a PRACH preamble in uplink. The preamble is transmitted for an access slot interval having a length of 1.33 ms. One of 16 kinds of signatures is selected and transmitted for a first predetermined length of the access slot. If the user equipment transmits the preamble, a base station transmits a response signal via a downlink physical channel which is a AICH (acquisition indicator channel). The AICH transmitted as a response for the preamble carries the signature selected by the preamble for a first predetermined length of an access slot corresponding to the access slot for transmitting the preamble. In this case, the base station transmits an positive response (ACK: acknowledgement) or a negative response (NACK: non-acknowledgement) to the user equipment using the signature carried by the AICH. If the user equipment receives ACK, it transmits an RRC connection request message to the network using an allocated radio resource. Thereafter, the network transmits a contention resolution message and an RRC connection setup message to the user equipment. If the user equipment receives NACK, it indicates a PRACH transmission to the physical layer of the UE again after an appropriate duration. Meanwhile, if the AICH corresponding to the preamble transmitted by the user equipment is not received, the user equipment transmits a new preamble by a power 1-step higher than that of the previous preamble after a predetermined access slot.

DISCLOSURE OF THE INVENTION

Technical Problem

In the related art, a random access procedure used in counting the number of user equipments attempting to receive a broadcast/multicast service is not stopped until a random access succeeds. Hence, even if a network stops an MBMS counting process, a user equipment may keep performing the random access process for the counting. However, due to this reason, an unnecessary random access takes place in the MBMS counting. Therefore, an overhead is generated and resources are wasted.

Technical Solution

Accordingly, the present invention is directed to a random access method for a multimedia broadcast multicast service in a wireless mobile communication system that substantially obviates one or more of the problems due to limitations and disadvantages of the related art.

An object of the present invention is to provide a method of reducing overhead and resource waste which are generated in the course of an uplink access of a user equipment in association with a broadcast/multicast service.

Another object of the present invention is to provide a method of stopping an uplink access of a user equipment in association with a broadcast/multicast service.

Another object of the present invention is to provide a method of stopping an uplink access of a user equipment even if an access between a user equipment and a network in association with the service fails.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

One embodiment of the present invention is characterized in that a network is able to transmit a downlink message for indicating to stop an access to a user equipment in the course of an uplink access associated with a broadcast/multicast service. Preferably, if the access stop message is received, the user equipment is able to stop the uplink access process regardless of failure or success of the uplink access.

To achieve these and other advantages and in accordance with the purpose of the present invention, as embodied and broadly described, a method of performing a random access procedure, which is performed by a specific user equipment attempting to receive a specific broadcast/multicast service in a wireless communication system, according to the present invention includes the steps of receiving a first message transmitted to count the number of user equipments attempting to receive the broadcast/multicast service from a network, transmitting a preamble for a random access to the network, receiving a second message including a user equipment identifier for identifying the user equipment and uplink (UL) radio resource allocation information in response to the preamble from the network, transmitting a third message to the network using the uplink radio resource allocation information, and stopping the random access procedure in case of receiving a contention resolution message from the network.

To further achieve these and other advantages and in accordance with the purpose of the present invention, a method of counting the number of user equipments attempting to receive a specific broadcast/multicast service in a network of a wireless communication system, includes the steps of transmitting a first message to count the number of user equipments attempting to receive the broadcast/multicast service, receiving a random access preamble from a specific user equipment, transmitting a second message including a user equipment identifier for identifying the user equipment and uplink (UL) radio resource allocation information in response to the random access preamble to the user equipment, receiving a third message transmitted from the user equipment using the uplink radio resource allocation information, counting the user equipment as the user equipment attempting to receive the broadcast/multicast service, and transmitting a contention resolution message to the user equipment.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, overhead and resource waste generated from an uplink access process of a user equipment associated with a broadcast/multicast service can be reduced.

Secondly, an uplink access of a user equipment associated with the service can be stopped.

Thirdly, even if an access between a network and a user equipment associated with the service fails, an uplink access of the user equipment can be stopped.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings. Embodiments explained in the following description are examples that the technical features of the present invention are applied to E-UMTS (evolved universal mobile telecommunications system).

Figure 1:
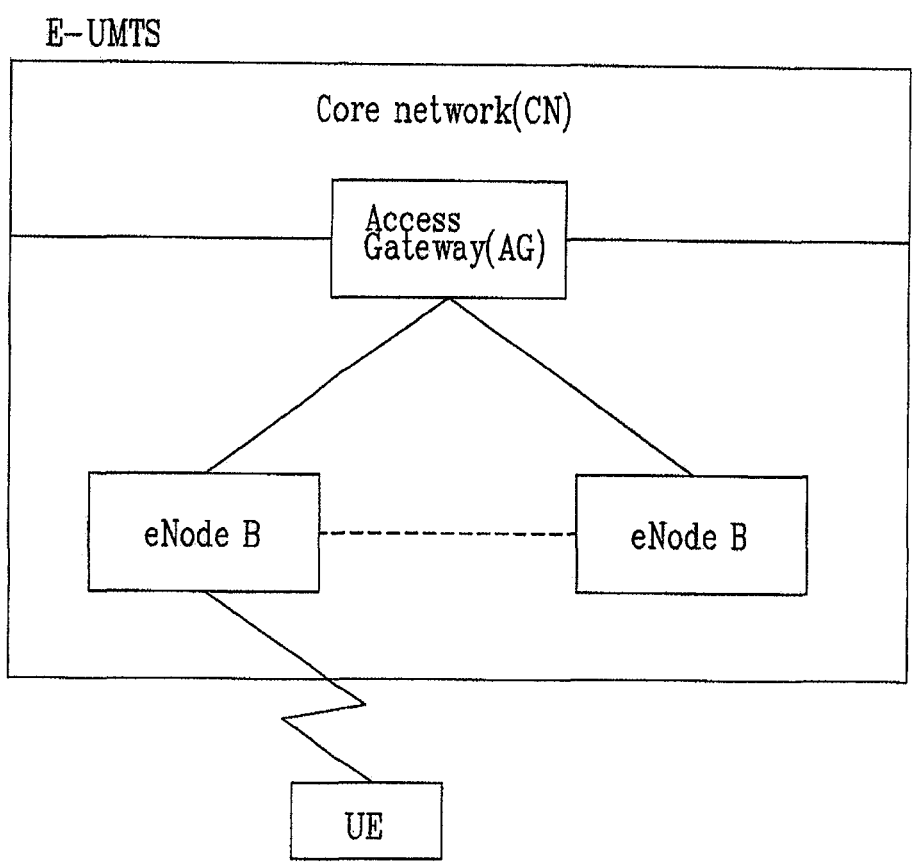
FIG. 1 a diagram of a network structure of E-UMTS.

FIG. 1 a diagram of a network structure of E-UMTS. First of all, E-UMTS is the system evolving from the conventional WCDMA UMTS and its basic standardization is ongoing by 3GPP ($3^{rd}$ generation partnership project). And, the E-UMTS can be called LTE (long term evolution) system. For details of the technical specifications of UMTS and E-UMTS, Release 7 and Release 8 of '$3^{rd}$ generation partnership project: technical specification radio access network' can be referred to, respectively.

Referring to FIG. 1, E-UMTS mainly includes a user equipment (UE), a base station and an access gateway (AG) provided to an end point of a network (E-UTRAN) to be connected to an external network. Generally, the base station is able to simultaneously transmit multiplexed data streams for a broadcast service, a multicast service and/or unicast service. The AG can be divided into a part responsible for processing user traffic and a part responsible for processing control traffic. In this case, the AG for processing user traffic and the AG for processing control traffic can communicate with each other using a new interface in-between. At least one cell exists in a single eNB. Between eNBs, an interface for user traffic transmission or control traffic transmission can be used. A core network (CN) can include AG and a network node for user registration of UEs and the like. An interface for identifying the E-UTRAN and CN is available. The AG manages mobility of the user equipment by the unit of TA (tracking area). The TA includes a plurality of cells. If the user equipment moves away from a specific TA into another TA, it informs the AG that its located TA is changed.

Figure 2:
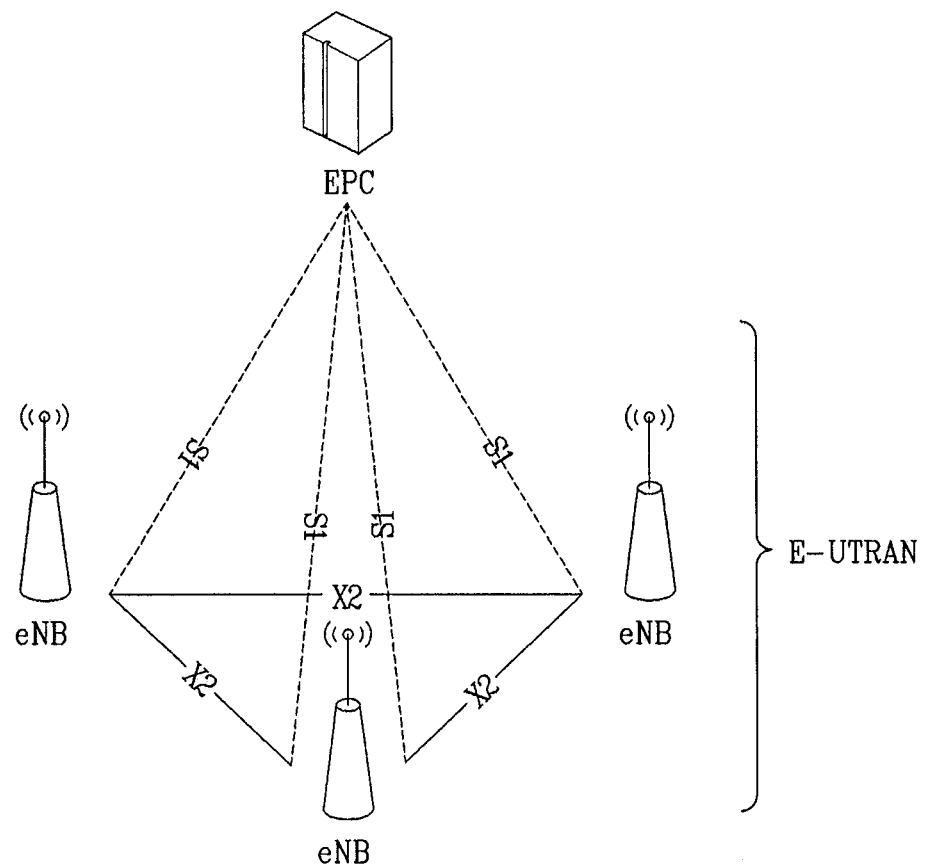
FIG. 2 is a schematic configurational diagram of E-UTRAN (evolved universal terrestrial radio access network)

FIG. 2 is a schematic configurational diagram of E-UTRAN (evolved universal terrestrial radio access network). The E-UTRAN system is the system evolving from the conventional UTRAN system. E-UTRAN includes base stations and eNBs are connected via X2 interface. The eNB is connected to a user equipment via a radio interface and is connected to an evolved packet core (EPC) via S1 interface.

Figure 3:
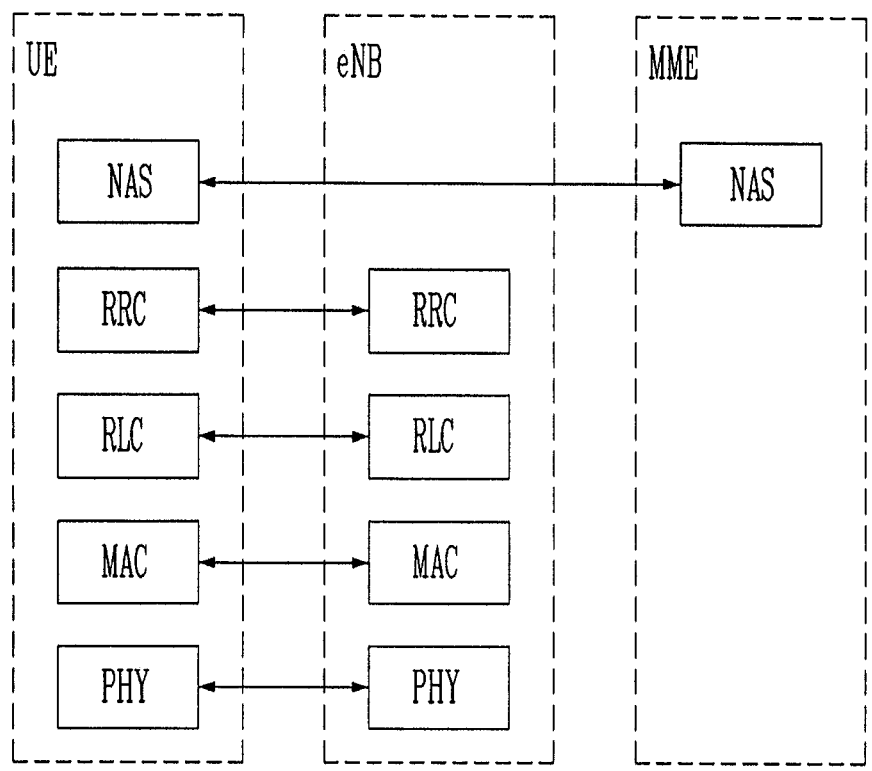
FIG. 3 is a diagram of a structure of a radio interface protocol between a user equipment (UE) and E-UTRAN.

FIG. 3 is a diagram of a structure of a radio interface protocol between a user equipment (UE) and E-UTRAN. Referring to FIG. 3, a radio protocol layer horizontally includes a physical layer, a data link layer and a network layer. And, the radio protocol layer vertically includes a user plane for data information transfer and a control plane for control signal transfer (signaling). The radio protocol layers shown in FIG. 3 can be divided into L1 (first layer), L2 (second layer) and L3 (third layer) based on three lower layers of the open system interconnection (OSI) reference model widely known in the field of communication systems.

A physical layer of a first layer provides an upper layer with an information transfer service using a physical channel. The physical layer is connected to a medium access control layer on an upper layer via a transport channel. And, data is transferred between the medium access control layer and the physical layer via the transport channel. Moreover, data are transferred via the physical channel between different physical layers, i.e., between a physical layer of a transmitting side and a physical layer of a receiving side. The physical layer is modulated by OFDM (orthogonal frequency division multiplexing) scheme and utilizes time and frequency as radio resources.

A medium access control (hereinafter abbreviated 'MAC') of a second layer provides a radio link control layer of an upper layer with a service via a logical channel. The radio link control (hereinafter abbreviated RLC) of the second layer supports a reliable data transmission. A PDCP layer of the second layer performs a header compression function for reducing unnecessary control information to efficiently transmit such an IP packet as IPv4 and IPv6 in a radio interface having a relatively narrow bandwidth.

A radio resource control (hereinafter abbreviated RRC) layer located at a lowest part of a third layer is defined in the control plane only and is responsible for controlling a logical channel, a transport channel and a physical channel in association with configuration, reconfiguration and release of radio bearers (hereinafter abbreviated RBs). In this case, each of the RBs means a service provided by the second layer for the data transfer between the user equipment and the E-UTRAN. For this, RRC layers exchange RRC messages between a user equipment and a network. If RRC connection is established between an RRC layer of a user equipment and an RRC layer of a network (RRC connected), the user equipment is in an RRC connected mode. If not, the user equipment is in an idle mode.

A non-access stratum (NAS) layer located above the RRC layer performs functions of session management, mobility management and the like.

A single cell belongs to an eNB is set to one of bandwidths including 1.25 MHz, 2.5 MHz, 5 MHz, 10 MHz, 20 MHz and the like to provide a downlink or uplink transmission service to a plurality of user equipments. In this case, different cells can be set to different bandwidths, respectively.

A downlink transport channel for transmitting data to a user equipment from a network includes a broadcast channel (BCH) for transmitting system information, a paging channel (PCH) for transmitting a paging message or a downlink SCH (shared channel) for transmitting a user traffic or control message. Traffic of downlink multicast or broadcast service or a control message can be transmitted via the downlink SCH or a separate downlink MCH (multicast channel). Meanwhile, an uplink transport channel for transmitting data from a user equipment to a network includes a random access channel (RACH) for transmitting an initial control message and an uplink shared channel (SCH) for transmitting a user traffic or control message.

A logical channel located above a transport channel to be mapped to the transport channel includes a broadcast control channel (BCCH), a paging control channel (PCCH), a common control channel (CCCH), a multicast control channel (MCCH), a multicast traffic channel (MTCH) or the like.

Figure 4:
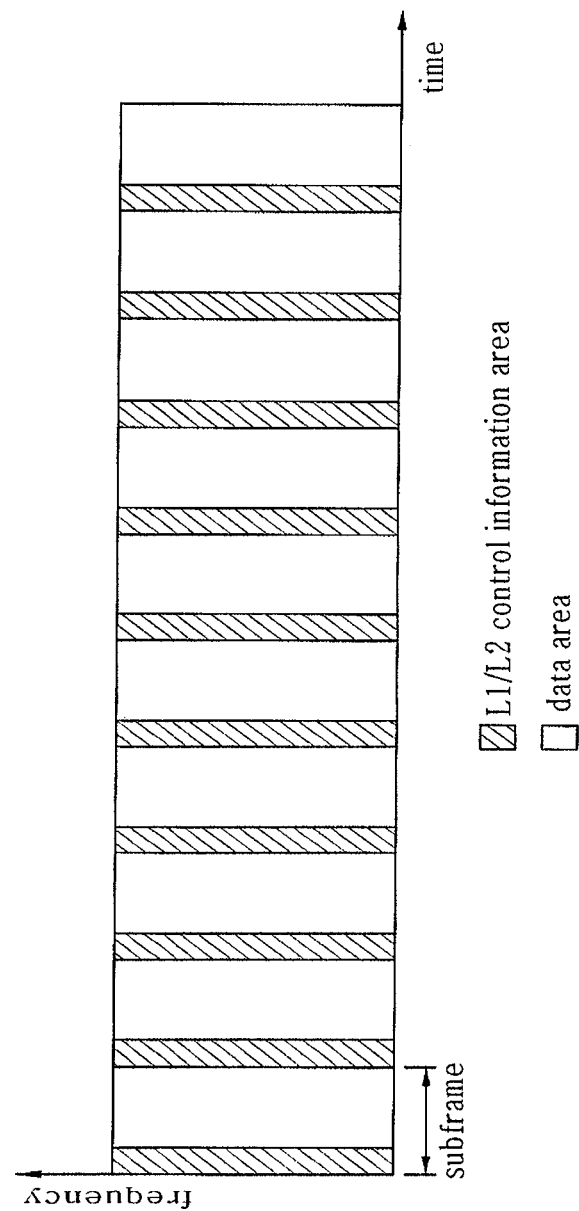
FIG. 4 is a diagram for an example of a physical channel structure used for E-UMTS.

FIG. 4 is a diagram for an example of a physical channel structure used for E-UMTS. A physical channel is constructed with a plurality of subframes on a time axis and a plurality of subcarriers on a frequency axis. In this case, a single subframe includes a plurality of symbols on the time axis. Each of the subframes includes a plurality of resource blocks. And, each of the resource blocks includes a plurality of symbols and a plurality of subcarriers. And, each of the subframes is able to use specific subcarriers of specific symbols (e.g., first symbol) of a corresponding subframe for a physical downlink control channel (PDCCH), i.e., L1/L2 control channel. An L1/L2 control information transmission area (hatched part) and a data transmission area (non-hatched part) are shown in FIG. 4. In the E-UMTS (evolved universal mobile telecommunication system) in progress of discussion, a radio frame of 10 ms is used. And, a single radio frame is constructed with ten subframes. And, each of the subframes includes two continuous slots. A length of a single slot is 0.5 ms. A single subframe is constructed with a plurality of OFDM symbols. And, some of a plurality of the OFDM symbols (e.g., first symbol) can be used to transmit L1/L2 control information.

Figure 5:
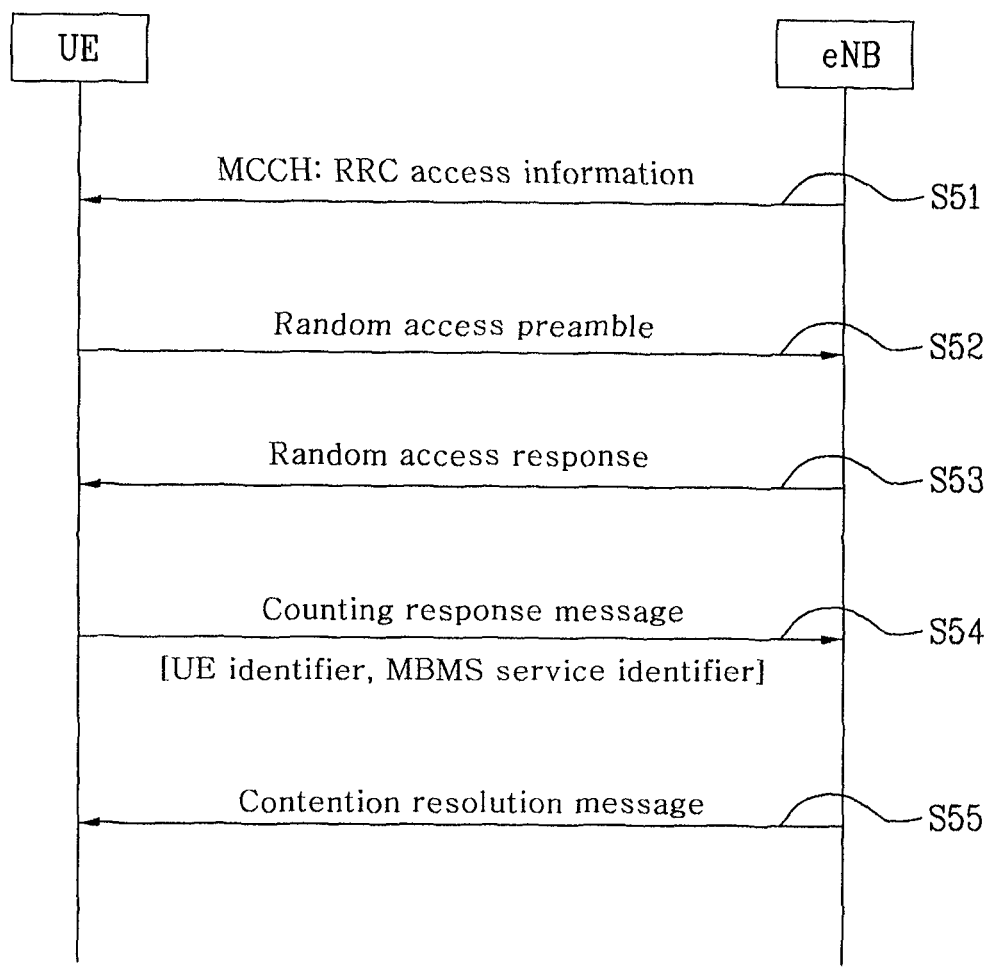
FIG. 5 is a flowchart according to one embodiment of the present invention.

FIG. 5 is a flowchart according to one embodiment of the present invention. FIG. 5 shows an example that the technical features of the present invention are applied to a user equipment that participates in an MBMS counting process.

Referring to FIG. 5, in order to provide a specific broadcast/multicast service, a base station transmits a first message for counting user equipments attempting to receive the service to a user equipment [S51]. MBS counting is then initiated by the first message. The first message can be an RRC message or a MAC control element, and preferably, an RRC connection information message. The first message can include at least one preamble (e.g., a specific preamble or a preamble set) allocated for the broadcast/multicast service. The first message can include a service identifier allocated by a CN or a RRC layer of the base station to identify the corresponding broadcast/multicast service. The service identifier can be an MTCH RNTI (radio network temporary identity) of MTCH or an MBMS RNTI. Moreover, the first message can further include a separate counting indicator for indicating an MBMS counting. The counting indicator can be a specific bit indicating '0' or '1'. Although the first message can be normally transmitted via a MCCH, it can be transmitted via a PDCCH as well. In case that the first message is transmitted via the PDCCH, the base station transmits the service identifier and the counting indicator together or separately.

If the user equipment is not interested in the specific broadcast/multicast service, the first message is ignored by the user equipment. Yet, if the user equipment attempts to receive the specific broadcast/multicast service, the user equipment tries an uplink access to join the MBMS counting process which is initiated by the base station [S52]. The uplink access can be achieved by the random access procedure. For instance, the user equipment transmits a preamble to the base station according to the random access procedure. The preamble is allocated from the base station via the first message or may be set at the user equipment in advance. The allocated preamble is associated with the specific broadcast/multicast service. Hence, the base station is able to recognize that the user equipment joins the MBMS counting of the specific service using the preamble. On the contrary, in case that the preamble set at the user equipment in advance is used, a service identifier can be further included to indicate that the preamble is associated with the MBMS counting. Preferably, the preamble for the specific service is used. In case that the user equipment is provided with a user equipment dedicated preamble, the dedicated preamble is preferentially used rather than other preambles mentioned in the above description.

In case of receiving the random access preamble successfully, the base station transmits a second message to the user equipment in response to the preamble [S53]. The second message may include an identifier for the preamble, timing adjustment, newly allocated user equipment identifier (e.g., temporary C-RNTI, etc.), uplink radio resource allocation information, etc. The second message may be a random access response message. If the random access response message is not received by the user equipment within a certain period of time, or all the received random access responses do not include the identifier for the preamble transmitted by user equipment and the allocated user equipment identifier, then the user equipment considers the random access procedure fails and may retransmit preamble for a certain number of times according to the step S52.

The user equipment receives the second message in response to preamble [S54]. If none of an identifier for the preamble transmitted by the user equipment (or code sequence corresponding to the preamble), the user equipment identifier (or the service identifier) and the uplink radio resource allocation information is not contained in the received second message, the user equipment does not transmit a third message to the base station.

On the contrary, if the identifier for the preamble transmitted by the user equipment and the allocated user equipment identifier (e.g., temporary C-RNTI) are contained in the second message, the user equipment transmits a third message to the base station in response to the MBMS counting using the uplink radio resource allocation information. Alternatively, in case that the identifier of the preamble transmitted by the user equipment and the service identifier (e.g., MBMS identifier such as MTCH RNTI) are contained in the received second message, the user equipment transmits a third message to the base station according to the uplink radio resource allocation information.

The third message can include at least one of the user equipment identifier and the service identifier, and preferably both of the user equipment identifier and the service identifier. The third message can be transmitted via the RRC message or the MAC control element. Preferably, the service identifier is transmitted in uplink by being contained in the MAC control element. In case of receiving the third message successfully, the base station counts the user equipment as a user equipment that receives the specific broadcast/multicast service.

After the user equipment has successfully transmitted the third message, the base station transmits a contention resolution message [S55]. The contention resolution message is transmitted via a DL SCH or a PDCCH, and preferably, via the PDCCH. The contention resolution message can include at least one of the user equipment identifier and the service identifier. Preferably, the contention resolution message includes both of the user equipment identifier and the service identifier. More preferably, the contention resolution message includes the service identifier only. The contention resolution message enables the user equipment attempting the uplink access via the random access procedure to stop the random access procedure in response to the third message. By the contention resolution message, the base station is able to control the unnecessary random access procedure of the user equipment attempting to receive the broadcast/multicast service. In the following description, operations of the contention resolution message are explained in detail.

First of all, in case that the contention resolution message is transmitted via a DL SCH, it can be transmitted via the RRC message or MAC control element. In this case, the contention resolution message can be transmitted via a logical channel which is a DCCH, a CCCH, a MCCH or a MTCH. A single contention resolution message transmitted via a DL SCH can include at least one user equipment identifier or at least one service identifier associated with the MBMS counting.

In this case, the user equipment firstly receives a PDCCH. If the PDCCH carries the user equipment identifier or the service identifier (MBMS identifier such as MTCH RNTI), the user equipment receives the contention resolution message via a DL SCH. If the received contention resolution message is indicated to the user equipment in association with the specific broadcast/multicast service (e.g., PDCCH: user equipment identifier transmission, DL SCH: service identifier transmission, and vice versa), the user equipment decides that the contention of the third message having been transmitted in response to the MBMS counting is resolved and then stops the uplink access for the counting, i.e., the random access procedure.

Preferably, the service identifier is transmitted via the PDCCH. In case that the user equipment receives the service identifier, the user equipment stops the uplink access associated with the MBMS counting regardless of the success of the access to the base station. Namely, in case that the access to the base station fails (e.g., a case that its user equipment identifier is not contained in the contention resolution message received via a DL SCH), the user equipment stops the corresponding procedure instead of repeating the procedure for the uplink access. The reason why the base station counts the number of user equipments attempting to receive the broadcast/multicast service is to effectively operate the service. For example of this operation, the base station provides a point-to-point service via a dedicated channel by considering the number of user equipments attempting to receive the same service or can provide a point-to-multipoint service via a shared channel. Hence, if contention takes place between the user equipments attempting to receive the service, the counting process may become unnecessary due to such a fact. In this case, regardless of success or failure of the access between the user equipment and the base station, the uplink access of the user equipment is stopped. Preferably, even if the user equipment fails in the access, the uplink access of the user equipment is stopped. Therefore, it is able to effectively reduce the unnecessary overhead and the resource waste.

Alternatively, the contention resolution message can contain a counting stop indicator indicating a stop of the MBMS counting process. In this case, a user equipment identifier and/or a service identifier can be transmitted via the PDCCH. The user equipment receives a contention resolution message via a DL SCH while monitoring the PDCCH. Thereafter, if the counting stop indicator is contained in the contention resolution message, the user equipment stops an uplink access. In case that the user equipment identifier is transmitted via the PDCCH, it is able to individually control an uplink access of each user equipment. In case that the service identifier is transmitted via the PDCCH, it is able to simultaneously control uplink accesses of user equipments that use the same service identifier. Therefore, regardless of individual contentions of user equipments joining the MBMS counting, i.e., even if an access fails, the base station is able to recollect radio resources by collectively stopping the uplink access procedure of the user equipments. In the former scheme, the service identifier and the counting stop indicator are separately represented. Yet, in the latter scheme, the service identifier can play a role as the counting stop indicator.

In case that the contention resolution message is transmitted via the PDCCH, the PDCCH transmits the service identifier (e.g., MBMS identifier such as MTCH RNTI). If the user equipment receives the service identifier, the user equipment is able to operate as follows.

First of all, the user equipment interprets the service identifier as a counting stop and then stops a random access procedure for the counting.

Secondly, the user equipment interprets the service identifier as a resolution of the contention and then stops a random access procedure for the counting.

Therefore, regardless of success or failure of the contention resolution, and preferably, even if an access between the user equipment and the base station fails, in case of receiving a service identifier for a specific service, the user equipment stops the uplink access for the counting.

Moreover, the base station is able to designate a specific RNTI transmitted via the PDCCH to announce the counting stop. Besides, in order to announce the counting stop, the counting stop indicator can be transmitted together with the service identifier (e.g., MTCH RNTI) via the PDCCH.

The base station is able to transmit the contention resolution message at least twice. Preferably, the base station is able to transmit the contention resolution message as many times as a maximum HARQ retransmission count within the maximum HARQ retransmission count. The user equipment may not transmit HARQ ACK or HARQ NACK for the contention resolution message in the MBMS counting process.

The above-described embodiments include the combinations of the elements and features of the present invention in a prescribed form. Each of the elements and features should be considered selective unless there is an explicit mention. Each of the elements or features can be implemented in a manner of not being combined with another element or feature. Moreover, an embodiment of the present invention can be configured by combining elements and/or features in part. Order of operations explained in the description for the embodiments of the present invention can be modified. Some configuration or feature of a prescribed embodiment can be includes in another embodiment or can be replaced by corresponding configuration or feature of another embodiment. And, it is apparent that an embodiment is configured by combining claims not in an explicit citation relation together or that a new claim can be included by correction after application filing.

In this disclosure, embodiments of the present invention are mainly explained centering on the data transceiving relation between a user equipment and a base station. A specific operation explained as performed by a base station can be performed by an upper node in some cases. In particular, it is apparent that various operations performed for the communications with a user equipment on a network including a plurality of network nodes including a base station can be performed by the base station or other network nodes except the base station. A base station can be replaced by one of a fixed station, a Node B, an eNode B (eNB), an access point and the like. And, a terminal can be replaced by one of a user equipment, an MS (mobile station), an MSS (mobile subscriber station) and the like.

Embodiments according to the present invention can be implemented by various means such as hardware, firmware, software and any combinations thereof. In case of the implementation by hardware, one embodiment of the present invention can be implemented by at least one selected from the group consisting of ASICs (application specific integrated circuits), DSPs 9 digital signal processors), DSPDs (digital signal processing devices), PDLs (programmable logic devices), FPGAs (field programmable gate arrays), processors, controllers, microcontroller, microprocessors and the like.

In case of the implementation by firmware or software, one embodiment of the present invention can be implemented in forms of modules, procedures, functions and the like for performing the above-explained functions or operations. Software code is stored in a memory unit and can be then driven by a processor. The memory unit is provided within or outside the processor to exchange data with the processor via various means known in public.

INDUSTRIAL APPLICABILITY

The above-described embodiments and advantages are exemplary and are not to be construed as limiting the present invention. The technical idea disclosed in the present specification is applicable to devices in different types with ease.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for receiving a broadcast/multicast service (MBMS) in a wireless communication system, the method performed by a user equipment (UE) and comprising:
   receiving a first message transmitted to count a number of UEs attempting to receive the MBMS;
   transmitting a preamble for a random access process for the MBMS;
   receiving a second message including uplink radio resource allocation information in response to the preamble;
   transmitting a third message using the uplink radio resource allocation information, the third message including a UE identifier of the UE;
   receiving a contention resolution message in response to the third message;
   stopping the random access process when the contention resolution message includes the UE identifier of the UE, wherein the contention resolution message including the UE identifier of the UE indicates an ACK (acknowledgement) for the third message; and stopping the random access process when the contention resolution message does not include the UE identifier of the UE, wherein the contention resolution message not including the UE identifier of the UE indicates an NACK (negative acknowledgement) for the third message.

2. The method of claim 1, wherein the first message includes at least one or more preambles allocated for the MBMS.

3. The method of claim 1, wherein the first message includes a service identifier for identifying the MBMS.

4. The method of claim 2, wherein the preamble for the random access process is selected from the allocated at least one or more preambles.

5. The method of claim 1, wherein the second message includes a temporary UE identifier for identifying the UE during the random access process.

6. The method of claim 3, wherein the third message includes at least the temporary UE identifier and the service identifier.

7. Previously Presented) The method of claim 6, wherein the contention resolution message includes at least the temporary UE identifier and the service identifier.

8. The method of claim 5, wherein the temporary UE identifier includes a temporary C-RNTI (Cell Radio Network Temporary Identifier).

9. The method of claim 1, wherein the third message is transmitted through MAC (Medium Access Control) control element.

10. The method of claim 1, wherein the third message is transmitted after the random access process.

* * * * *